(No Model.)
T. R. FERRALL.
ANTI FRICTION BEARING.
No. 250,903. Patented Dec. 13, 1881.
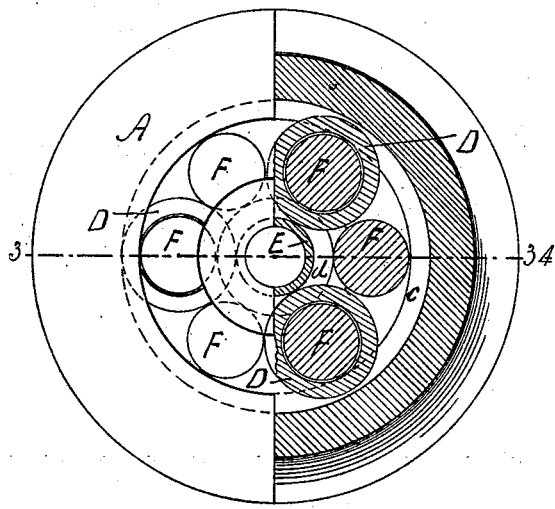
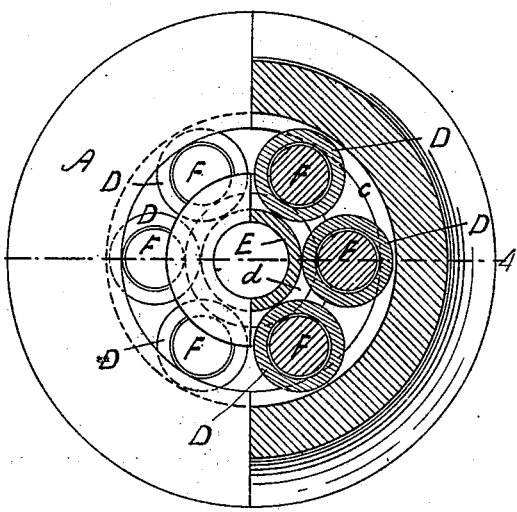
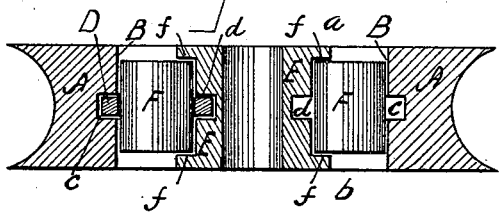
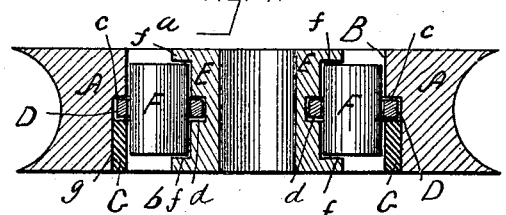
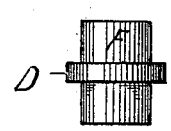
Witnesses:
Wm. S. Bellows.
W. H. Quincy
Inventor:
Thos. R. Ferrall
Per Brown Bros.
Attorneys.

UNITED STATES PATENT OFFICE.

THOMAS R. FERRALL, OF BOSTON, ASSIGNOR TO HERBERT LOUD, OF EVERETT, MASSACHUSETTS.

ANTI-FRICTION BEARING.

SPECIFICATION forming part of Letters Patent No. 250,903, dated December 13, 1881.

Application filed September 30, 1881. (No model.)

*To all whom it may concern:*

Be it known that I, THOMAS R. FERRALL, of Boston, in the county of Suffolk and State of Massachusetts, have invented certain new and useful Improvements in Anti-Frictional Bushings, of which the following is a full, clear, and exact description.

This improved anti-frictional bushing is composed, in substance, of a loose sleeve shouldered at each end, and on its exterior periphery grooved between its two so shouldered ends, and of a series of loose rings running within said sleeve-groove and an interior peripheral groove of a surrounding box or casing, in combination with friction-rolls arranged to turn loosely in said rings, one roll to each ring, and either or not between said rings, and to roll or bear against and upon the interior periphery of the box or casing, and the exterior periphery of the sleeve, and to be confined at their ends between the end shoulders of the sleeve and otherwise, all substantially as hereinafter described.

In the accompanying plate of drawings, Figures 1 and 2 are similar views, in one half a face, and in the other half a section of an anti-frictional bushing of the present improved construction; Figs. 3 and 4, sectional views on lines 3 3 and 4 4, respectively, of Figs. 1 and 2; Figs. 5, 6, and 7, views, in detail, of the sleeve, rolls, and roll-rings detached, and as will hereinafter more fully appear.

In the drawings, A represents an annular box or casing, in the present instance made to serve as a pulley and open at each end. This box, midway between its two open ends, $a$ and $b$, has a square-sided groove, $c$, peripheral around its inner side, B, and in this groove loosely run a series of similar rings, D, which similarly run in a peripheral square-sided groove, $d$, around the outside and midway between the two ends of a sleeve, E, having a shoulder, $f$, at each end.

F F represent a series of friction-rolls turning loosely in the rings, one to each ring, and moving and bearing against the inner periphery or surface of the casing A and the outer periphery of the sleeve F, between its end shoulders, $f$, which confine the rollers in place end to end.

The above constitutes the bushing, and in use the sleeve E is suspended upon the axial pin about which the pulley is turned and the bushing is to operate. The shouldered ends of the sleeve hold the rolls, and the rings hold the sleeve in place and against escape from the casing.

The rolls may each have a ring, as shown in Fig. 2, or the rings with their rolls may be made to alternate with rolls without rings, as shown in Fig. 1. The rings hold the rolls separated from each other.

To enable the rings, rolls, and sleeve to be placed together, as described, and in relation to the groove in the casing, it is either necessary that the opening in the casing be made on one end of an enlarged diameter, as shown at $g$ in Fig. 4, and then a ring, G, inserted to secure the channel or groove for the rings, or that the casing be cast upon the rings, after in place, in a manner to secure such groove.

If desired, the rings can be rigidly secured to the rolls instead of having them loose, as described.

Having thus described my invention, what I claim, and desire to secure by Letters Patent, is—

The combination, with the sleeve having shoulders $f$ and intermediate groove, $d$, the casing A, having annular groove $c$, and the series of friction-rolls F, of the series of independent rings D, one being arranged upon and encircling some or all of the said friction-rolls, substantially in the manner and for the purpose described.

In testimony whereof I have hereunto set my hand in the presence of two subscribing witnesses.

THOS. R. FERRALL.

Witnesses:
EDWIN W. BROWN,
WM. S. BELLOWS.